United States Patent [19]
Aflague et al.

[11] Patent Number: 5,385,191
[45] Date of Patent: Jan. 31, 1995

[54] BINARY INNER TUBE FOR TIRE

[76] Inventors: Allen Aflague, 5445 E. Crescent, Mesa, Ariz. 85206; Mark Talbot, 358 S. 24th St., Mesa, Ariz. 85204

[21] Appl. No.: 158,169

[22] Filed: Nov. 26, 1993

[51] Int. Cl.$^6$ ............................ B60C 5/04; B60C 5/20; B60C 5/22

[52] U.S. Cl. .................................... 152/340.1; 141/4; 152/331.1; 152/339.1; 152/811

[58] Field of Search ............... 152/340.1, 339.1, 331.1, 152/511–512, 516, 152; 141/4

[56] References Cited

U.S. PATENT DOCUMENTS

| | | | |
|---|---|---|---|
| 499,600 | 6/1893 | Sherbondy | 152/340.1 |
| 837,458 | 12/1906 | Fairchild | 152/340.1 |
| 1,081,010 | 12/1913 | Breitung | 152/340.1 |
| 1,178,809 | 4/1916 | Kraft et al. | 152/340.1 |
| 1,202,604 | 10/1916 | Stevenson | 152/340.1 |
| 1,433,643 | 10/1922 | Overlander | 152/340.1 |
| 1,506,161 | 8/1924 | Caldwell | 152/340.1 |
| 1,592,607 | 7/1926 | Lemos | 152/340.1 X |
| 1,696,707 | 12/1928 | Booth | 152/340.1 |
| 1,900,568 | 3/1933 | Krug | 152/340.1 |

*Primary Examiner*—Caleb Weston
*Assistant Examiner*—Adrienne C. Johnstone
*Attorney, Agent, or Firm*—Sandra L. Etherton

[57] ABSTRACT

A pneumatically-inflated inner tube having two compartments such that if one compartment is damaged and deflates, the other compartment may be inflated without removing the tire. The compartments inflate independently of each other using separate valves; each compartment has its own valve for inflation. When inflated, the two compartments surround the same annular axis. The two embodiments described have primary and secondary compartments. In the first embodiment, each compartment is a discrete component wherein the secondary compartment is disposed inside the primary compartment. The compartments connect where the valve of the secondary compartment projects through an aperture in the primary compartment. In the second embodiment, the two compartments form an integral unit. The compartments share a common surface such that one compartment is formed inside the other compartment. The primary compartment inflates using a valve disposed on the common surface which terminates at an aperture open to the primary compartment. The secondary compartment inflates using a valve disposed on the common surface in which the aperture opens to the secondary compartment.

2 Claims, 2 Drawing Sheets

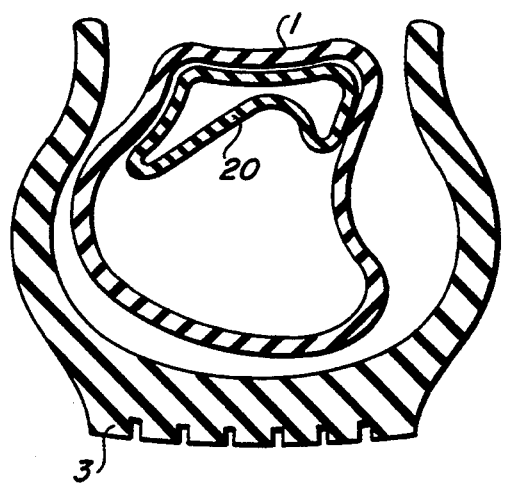
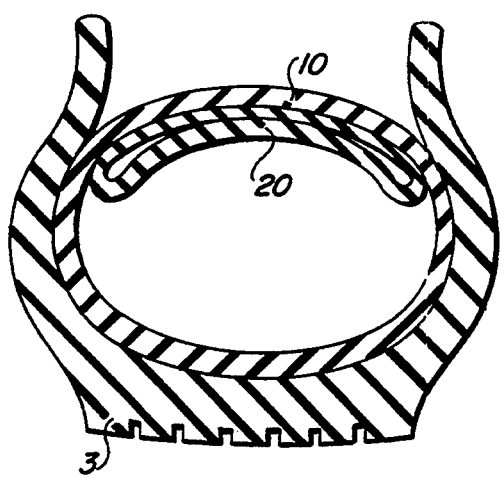
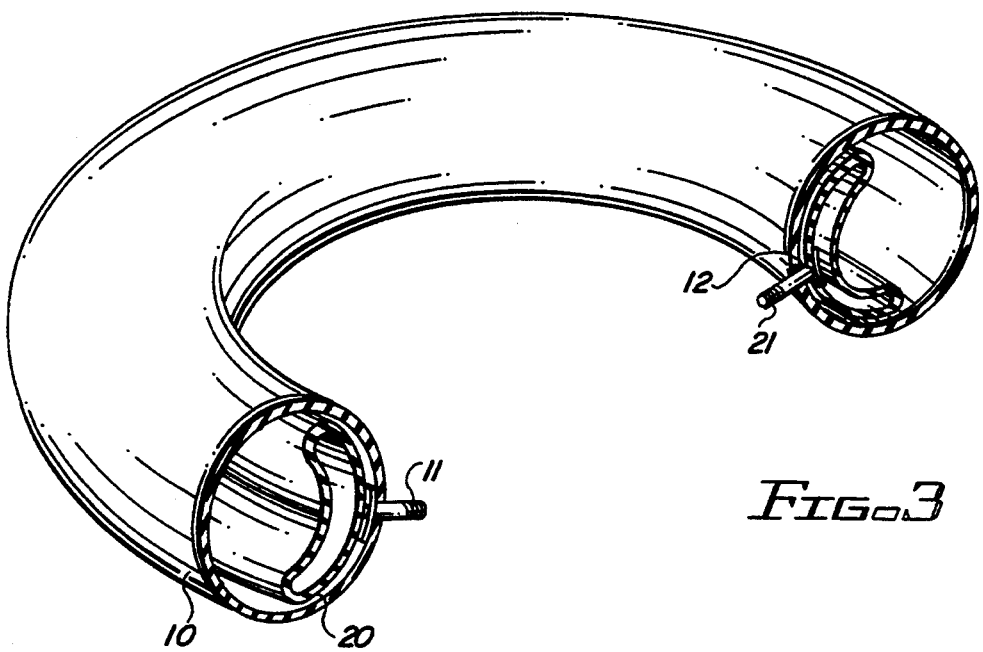
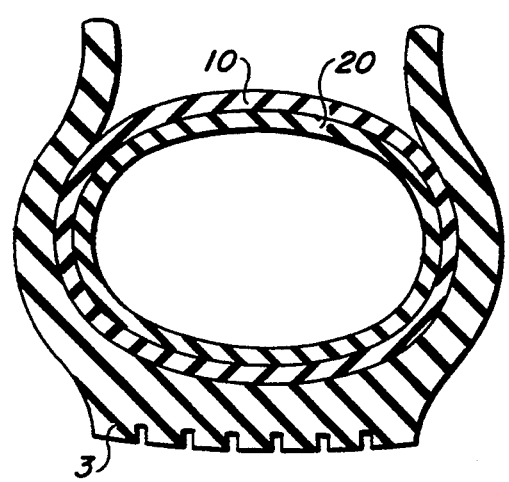

BINARY INNER TUBE FOR TIRE

BACKGROUND OF THE INVENTION

This invention relates generally to inner tubes for tires. More particularly this invention relates to a pneumatically-inflated inner tube that has two compartments such that if one compartment is damaged and deflates, the other compartment may be inflated without removing the tire. Each compartment has its own valve for inflation.

As known in prior art, an inner tube is typically an annular sheath of thin rubber-like material which, when filled with air and inserted in a tire casing, becomes a firm support for the flexible tire casing. The tire and inner tube assembly is then attached to a wheel for use on a bicycle, motorcycle or automobile. Inner tubes are thin-walled to achieve flexibility and elasticity and to reduce cost of manufacture and total weight of the tire assembly. However, because the tube walls are so thin, they are easily damaged. Once damaged, an inner tube will deflate and the tire will lose its support and go flat. In order to continue using the tire, the tire must then be removed from the wheel, the inner tube removed, repaired and replaced into the tire casing, and the whole tire assembly replaced on the wheel.

Removing, repairing and replacing an inner tube is time consuming. For bicycle and motorcycle racing, time is of the essence and the minutes spent changing a tire that has gone flat because of damage to its inner tube can be the difference between winning and losing the race. To combat losing this time, bicycle racers often carry spare inner tubes with them around their necks or waists. When a tire goes flat, a racer will stop and remove the tire from the wheel, remove the inner tube and either repair or replace it, and then reassemble the tire and wheel. Others racers have crews in vans or trucks with spare tires and tubes who follow along the bicycle route in case of a flat. If using the crews the racer does not have to carry his own supplies, but the time necessary to fix the flat is about the same. However, for mountain bike riders, these means of preparation are impractical.

Mountain bike trails often lead into rough terrain where the only means of access is by bike or on foot. The ground is rocky and cluttered with sharp stones, sticks and cactus spines. When a tire goes flat because the tube has been damaged, the options are limited to walking out (sometimes carrying the bike) or replacing the tube at the site it went flat. Because of the relative inaccessibility of mountain bike trails, the equipment and materials necessary to repair a flat on the trail must be carried along with the rider, adding weight and making the ride more strenuous. Both walking out and repairing a flat tire on a trail take considerable time and effort. If the flat occurs during a race, the race can be lost. But even if only on a recreational bike ride, the replacement of a tube can be frustrating and can ruin the ride by ending it prematurely.

By providing an inner tube with two compartments, a flat tire can be repaired quickly on the trail with little effort and little extra equipment. By employing the present invention, a second compartment within the existing inner tube acts like a spare inner tube. When the tire goes flat because the inner tube has been punctured, the rider simply inflates the second compartment already residing in the tire by using a standard air pump carried on the frame of the bicycle or by using a pressurized cartridge of $CO_2$. The tire does not have to be removed from the wheel in order to fix the flat. Time is saved and little effort is used to inflate the "spare" tube which is already in place.

Prior attempts have been made to solve the problem of repairing a damaged inner tube without removing the tire. U.S. Pat. No. 5,099,900 describes a self-healing tire system having an inner tube that is coated with a tacky sealant material. If the tube is punctured, the sealant material flows around and over the puncture site to seal it and prevent pressurized air from escaping. However, if the damage to the tube is too severe, the tacky sealant will not be able to seal the hole and the tube will have to be removed for repair or replacement.

Another U.S. Pat. No. 4,143,697, describes an inner tube assembly that has two annular chambers that are interconnected by one valve and separated by a retaining band. When the outermost chamber deflates, the innermost chamber maintains its pressure. However, the innermost chamber is necessarily of smaller diameter than the outermost chamber and if the outermost chamber deflates, the innermost chamber is limited in its circumferential expansion by the retaining band and consequently the tire volume is not completely supported.

BRIEF SUMMARY OF THE INVENTION

The present invention provides an improved means and method for inflating an inner tube without having to remove the tire. The present invention is a binary inner tube that has two air-tight compartments such that if one compartment is damaged and deflates, the other compartment may be inflated without removing the tire. The compartments inflate independently of each other using separate valves; each compartment has its own valve for inflation. For easy identification, the valves can be different colors.

Two embodiments of the binary inner tube are presented. In the first embodiment, each compartment is a discrete component wherein the secondary compartment is disposed inside the primary compartment. The primary compartment inflates using a valve disposed on its surface, and the secondary compartment inflates using a valve disposed on its surface. The compartments connect where the valve of the secondary compartment projects through an aperture in the primary compartment. When inflated, the two compartments surround the same annular axis.

In the second embodiment, the two compartments form an integral unit. The compartments share a common surface positioned such that one compartment is formed inside the other compartment. The primary compartment inflates using a valve disposed on the common surface which terminates at an aperture open to the primary compartment. The secondary compartment inflates using a valve disposed on the common surface in which the aperture opens to the secondary compartment. When inflated, the two compartments surround the same annular axis.

BRIEF DESCRIPTION OF THE DRAWINGS

FIG. 1 is a cross-section of tire showing the first embodiment of a binary inner tube in which neither of the compartments is inflated.

FIG. 2 is a cross-section of a tire showing the first embodiment of a binary inner tube in which the primary tube is inflated and the secondary tube is not inflated.

FIG. 3 is a cross-section of the first embodiment of a binary inner tube in which the primary compartment is inflated and the secondary tube is not inflated.

FIG. 4 is a cross-section of a tire showing the first embodiment of a binary inner tube in which the primary tube is deflated and the secondary tube is inflated.

DESCRIPTION OF THE PREFERRED EMBODIMENTS

Figure 5:
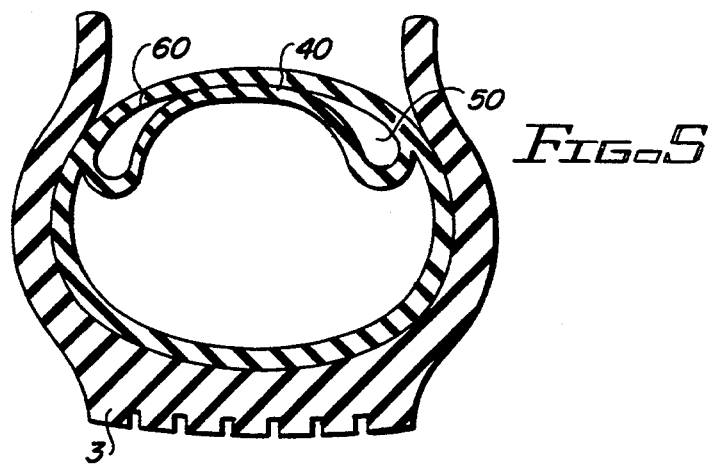
FIG. 5 is a cross-section of a tire showing the second embodiment of a binary inner tube in which the primary tube is inflated and the secondary tube is not inflated.

Two embodiments of this invention are described. Referring now to the accompanying drawings, FIG. 1 shows a cross-section of a deflated inner tube 1 inside a tire casing 3. FIG. 2 shows a cross-section of the first embodiment of the present invention having two discrete compartments, a primary compartment 10 and a secondary compartment 20. After the tire and uninflated inner tube are attached to a wheel, the primary compartment 10 in the inner tube is inflated and thereby supports the tire casing 3. The secondary compartment 20 is disposed inside the primary compartment 10 but is not inflated when the primary compartment is inflated. When inflated, the two compartments surround the same annular axis. The wheel rim and valves for inflating the compartments are not shown in FIG. 2.

The valves of both the primary and secondary compartments must be accessible from the outside of the tire assembly so that both compartments can be filled without removing the tire. Typically valves are placed on the inside diameter of the inner tube so that they project through holes in the wheel rim. They must open to admit air or other pressurized gas to inflate the inner tube and then automatically close to hermetically seal the inner tube. Several types of valves are used. Shrader valves are commonly used for recreational bicycle inner tubes and Presta valves are often used for racing tubes.

FIG. 3 is a cross-section of the binary inner tube in which the primary compartment 10 is inflated and the secondary compartment 20 is not. A tire casing is not shown in FIG. 3, but the valves are shown. The primary compartment valve 11 used to inflate the primary compartment is disposed on the surface of the primary compartment 10. The secondary compartment valve 21 used to inflate the secondary compartment 20 is disposed on the surface of the secondary compartment 20 and projects through an aperture 12 in the primary compartment. The valves are placed on the inside diameter of the inner tube so as to make them accessible through the wheel rim. They may be placed on opposite sides of the inside diameter of the inner tube to maintain weight balance of the tire assembly. For easy identification, the valve on the primary compartment may be colored differently from the valve on the secondary compartment.

FIG. 4 shows a cross-sectional view of the first embodiment of the binary inner tube 1 within a tire casing 3 after the secondary compartment 20 has been inflated because the primary compartment 10 has been deflated, due to damage by puncture, tear in the sidewall, or other means. While strength and durability of the materials used in making inner tubes are of primary importance, these factors must be balanced against other factors such as elasticity, impermeability to air, manufacturability and cost. Materials for inner tubes are well known in the art and include natural or butyl rubber, thermoplastic urethane rubber, and copolymers. The extrusion and vulcanization methods to make inner tubes are also well known in the art.

In FIG. 4, the secondary compartment 20 has been inflated inside the primary compartment 10, forcing the primary compartment 10 to expand against the interior walls of the tire casing 3. The;tire casing 3 is supported by the secondary compartment 20.

FIG. 5 shows a cross-section of the second embodiment of the present invention where the primary compartment 40 is inflated and supports the tire casing 3. In this embodiment the primary and secondary compartments form an integral unit. The binary inner tube is formed by positioning a piece of tube material across the inside of the primary compartment to form a secondary compartment. The compartments share a common surface 60 that forms the inside surface of the diameter of the inner tube. Like the first embodiment, the secondary compartment 50 is inside the primary compartment 40 and is not inflated when the primary compartment 40 is inflated. The valves are not shown in FIG. 5.

Figure 6:
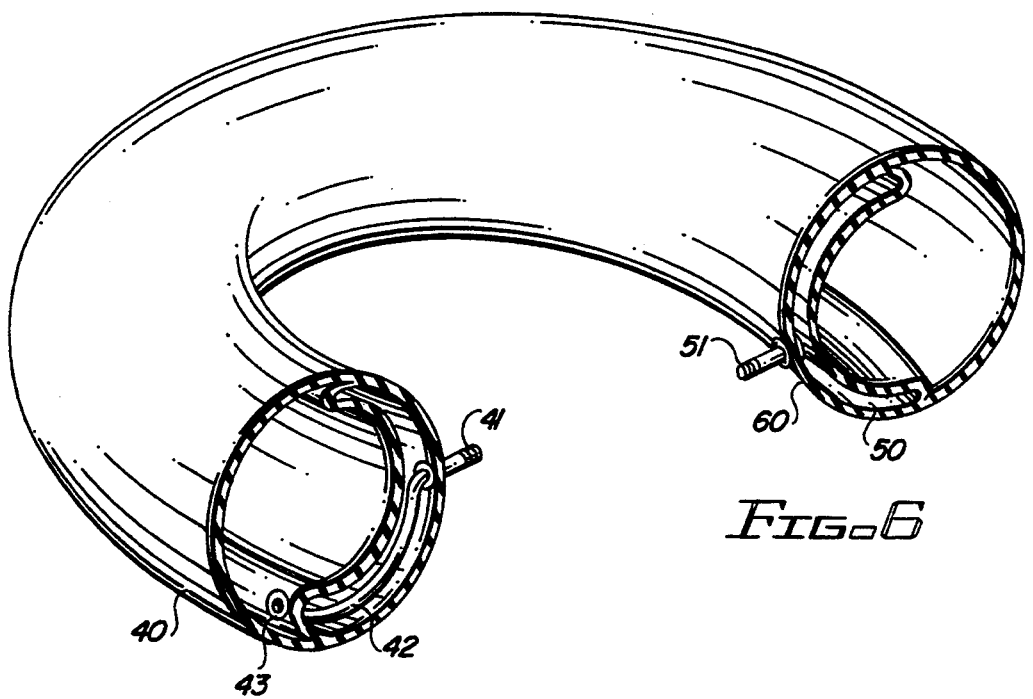
FIG. 6 is a cross-section of the second embodiment of a binary inner tube in which the primary compartment is inflated and the secondary tube is not inflated.

FIG. 6 is a cross-section of the second embodiment in which the primary compartment 40 is inflated and the secondary compartment 50 is not. A tire casing is not shown. Common surface 60 is shared by the compartments. The primary compartment valve 41 used to pressurize the primary compartment is disposed on the common surface 60. The primary compartment valve 41 has an extension tube 42 which runs along the side of the common surface until it meets the piece of tube material that is used to form the secondary compartment. There the extension tube 42 terminates at an aperture 43 open to the primary compartment. The secondary compartment valve 51 used to inflate the secondary compartment is disposed on the common surface 60. The primary compartment valve 41 is positioned on the opposite side of the inside diameter of the inner tube from the secondary compartment valve 51.

Figure 7:
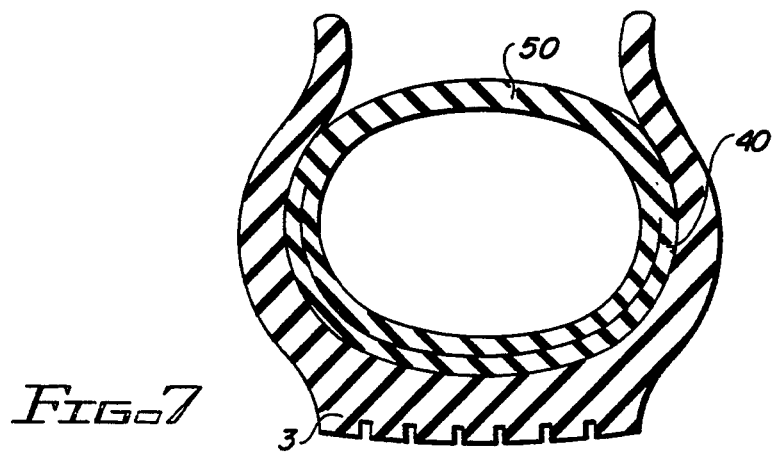
FIG. 7 is a cross-section of a tire showing the second embodiment of a binary inner tube in which the primary tube is deflated and the secondary tube is inflated.

FIG. 7 is a cross-sectional view of the second embodiment of the invention inner tube 1 within a tire casing 3 after the primary compartment 40 has been deflated, due to damage by puncture, tear in the sidewall, or other means. The secondary compartment 50 has been inflated inside the primary compartment 40, forcing the primary compartment 40 to expand against the interior walls of the tire casing 3.

The present invention provides an improved means and method for inflating an inner tube without having to remove the tire. These objectives are fulfilled by the present invention as described in the preceding sections. It is understood that variations and modifications which will appear evident to a person skilled in the art are considered to fall within the scope of this invention.

What we claim is:

1. An inner tube for a tire comprising:
   two annular compartments that have a common annular axis when inflated, the two annular compartments further comprising;
   a primary compartment having a valve for inflating the primary compartment disposed on a surface of the primary compartment and a secondary compartment having a valve for inflating the secondary compartment disposed on a surface of the secondary compartment;

wherein the secondary compartment is disposed inside the primary compartment, the primary compartment has an aperture through which the valve on the secondary compartment projects, and the valve on the secondary compartment projects through the aperture of the primary compartment; and the valve on the primary compartment is of a different color than the valve on the secondary compartment.

2. A method of inflating a flat tire after the inner tube has been damaged wherein the inner tube has:

an annular primary compartment and a valve for inflating the primary compartment disposed on the surface of the primary compartment;

an annular secondary compartment and a valve for inflating the secondary compartment disposed on the surface of the secondary compartment; wherein the primary and secondary compartments have a common annular axis when inflated;

the secondary compartment is disposed within the primary compartment;

the primary compartment is damaged and deflated;

the primary compartment has an aperture through which a valve of the secondary compartment projects;

the valve on the primary compartment is of a different color than the valve on the secondary compartment; and the secondary compartment is pressurized through the valve of the secondary compartment which projects through the aperture of the primary compartment;

comprising the step of inflating the secondary compartment through the valve of the secondary compartment.

* * * * *